United States Patent [19]

Gelatt

[11] Patent Number: 4,874,142

[45] Date of Patent: Oct. 17, 1989

[54] BLOW DRYER HOLDER

[76] Inventor: Sharon G. Gelatt, 9 N. Kern Ave., Woodland, Calif. 95695

[21] Appl. No.: 275,918

[22] Filed: Nov. 25, 1988

[51] Int. Cl.⁴ ............................................. F16M 11/10
[52] U.S. Cl. .................................................... 248/185
[58] Field of Search .................. 248/185, 309.1, 205.1, 248/102, 103, 105, 133, 137, 146, 152, 154, 313, 314; D28/17, 18, 73, 13, 15; D6/466, 449, 462; D7/70

[56] References Cited

U.S. PATENT DOCUMENTS

| | | | |
|---|---|---|---|
| 2,063,554 | 12/1936 | Meyerson | 248/106 |
| 4,225,106 | 9/1980 | Eplan | 248/309.1 X |
| 4,673,148 | 6/1987 | Oliver | 248/309.1 X |
| 4,696,447 | 9/1987 | Strecker | 248/206.3 |

Primary Examiner—Blair M. Johnson
Attorney, Agent, or Firm—Jerry T. Kearns

[57] ABSTRACT

An improved blow dryer holder includes a plastic ring member fixedly securable around the blow dryer and being pivotally attached to a support stand. The blow dryer is secured within the ring by means of a thumbscrew, and the ring includes an elongated thickened portion against which the blow dryer is forced by a tightening of the thumbscrew. The dryer is thus supported in a stable manner within the ring, and the ring can be pivoted to any angle to facilitate a desired use of the dryer. A bottom portion of the support stand includes a tray for holding hair clips, bobby pins, and the like.

1 Claim, 2 Drawing Sheets

BLOW DRYER HOLDER

BACKGROUND OF THE INVENTION

1. Field of the Invention

The present invention relates to support stands, and more particularly pertains to an improved supporting structure for a blow dryer.

2. Description of the Prior Art

The prior art is replete with examples of support stands for holding virtually any type of appliance wherein an advantage is obtained by the performance of such a support function. In this regard, there has already been developed at least one supporting structure for a hair blow dryer as evidenced by the issuance of U.S. Pat. No. 3,184,195, which issued to Wahl et al on May 18, 1965. The structure shown in this patent comprises a post member and a cooperating base member, and the post member is attachable to an electric hair dryer while being pivotally retained within the base member. As such, adjustable positioning of the hair dryer is possible during a use thereof without the necessity of the user manually holding and manipulating the dryer. While being functional for its intended purpose, it can be appreciated that the Wahl et al supporting structure is substantially unstable and could result in some degree of difficulty in properly orienting the hair dryer for convenient use. Accordingly, there appears to be a continuing need for a new and improved hair dryer supporting structure wherein a more flexible and stable positioning of the dryer could be achieved, and in this respect, the present invention substantially addresses this need.

SUMMARY OF THE INVENTION

In view of the foregoing disadvantages inherent in the known types of support structures for hair dryers now present in the prior art, the present invention provides an improved support structure for a hair dryer wherein an elongated retaining ring is designed to retain a dryer in combination with a thumbscrew locking means, and the retaining ring is pivotally movable on a support stand to provide any degree of adjustable positioning of the dryer as desired. As such, the general purpose of the present invention, which will be described subsequently in greater detail, is to provide a new and improved portable hair dryer support structure which has all the advantages of the prior art portable hair dryer support structures and none of the disadvantages.

To attain this, the present invention essentially comprises a support stand constructed substantially completely of clear lucite plastic and having a retaining ring positionable around a hair dryer. A thumbscrew is mounted in the retaining ring and is used to lockingly secure a hair dryer within the ring. To achieve a more stable positioning of the dryer within the ring, a portion of the ring is of an elongated construction to thus provide axial stability to the dryer when it is locked in position. The complete retaining ring may be pivoted about an upstanding support structure, and a bottom most portion of the support structure includes a base and a tray for holding small articles, such as hair clips, bobby pins, and the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hair dryer support stand which has all the advantages of the prior art hair dryer support stands and none of the disadvantages.

It is another object of the present invention to provide a new and improved hair dryer support stand which may be easily and efficiently manufactured and marketed.

It is a further object of the present invention to provide a new and improved hair dryer support stand which is of a durable and reliable construction.

An even further object of the present invention is to provide a new and improved hair dryer support stand which is susceptible of a low cost of manufacture with regard to both materials and labor, and which accordingly is then susceptible of low prices of sale to the consuming public, thereby making such hair dryer support stands economically available to the buying public.

Still yet another object of the present invention is to provide a new and improved hair dryer support stand which provides in the apparatuses and methods of the prior art some of the advantages thereof, while simultaneously overcoming some of the disadvantages normally associated therewith.

Still another object of the present invention is to provide a new and improved hair dryer support stand which provides for increased axial stability of the dryer when the same is supported on the stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
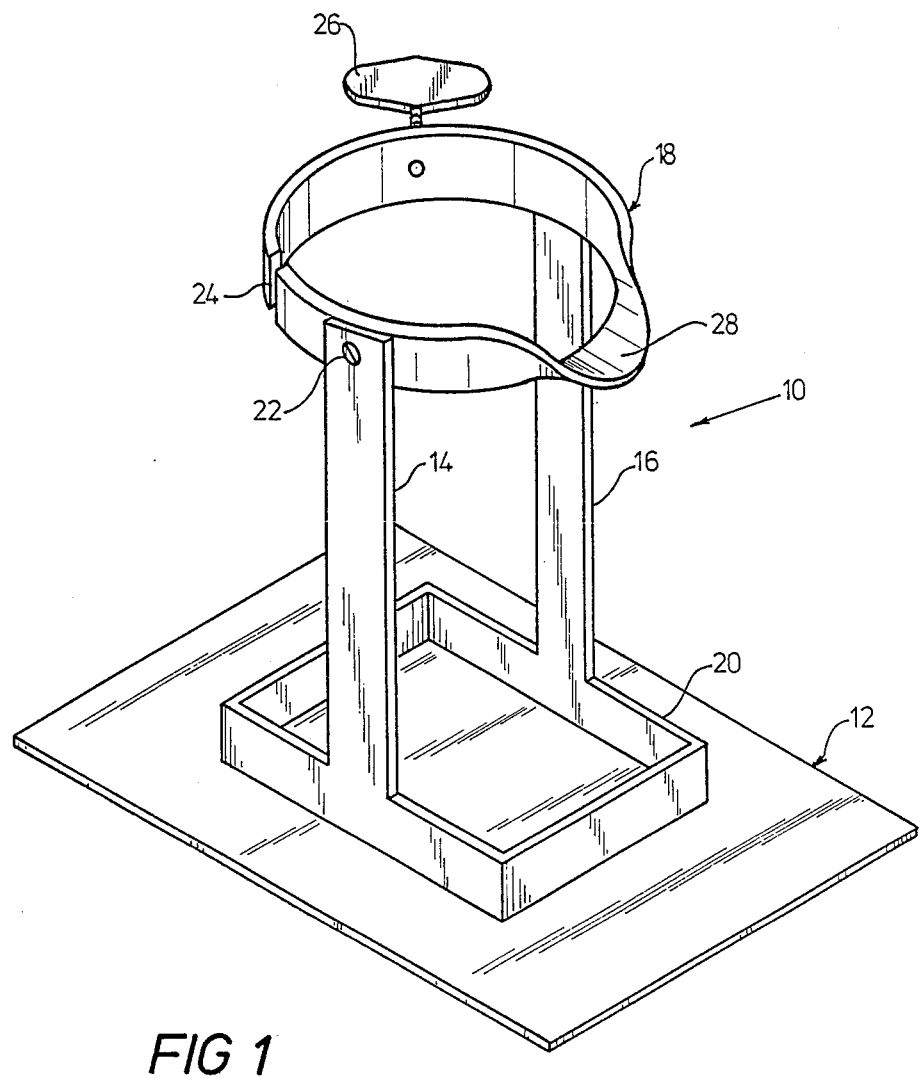
FIG. 1 is a perspective view of the hair dryer support stand comprising the present invention.
Figure 2:
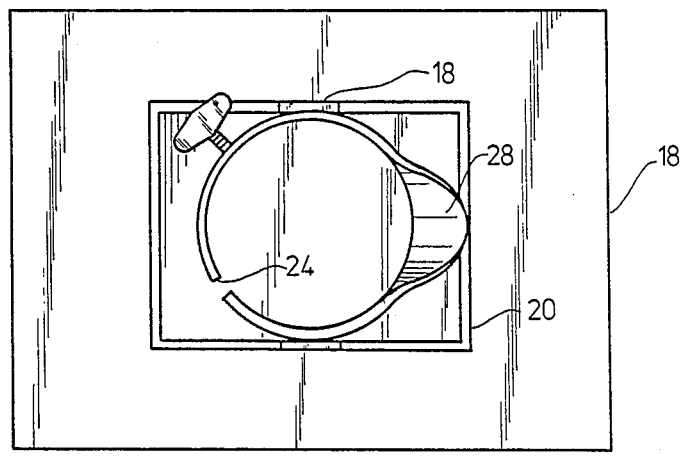
FIG. 2 is a top plan view of the invention.
Figure 3:
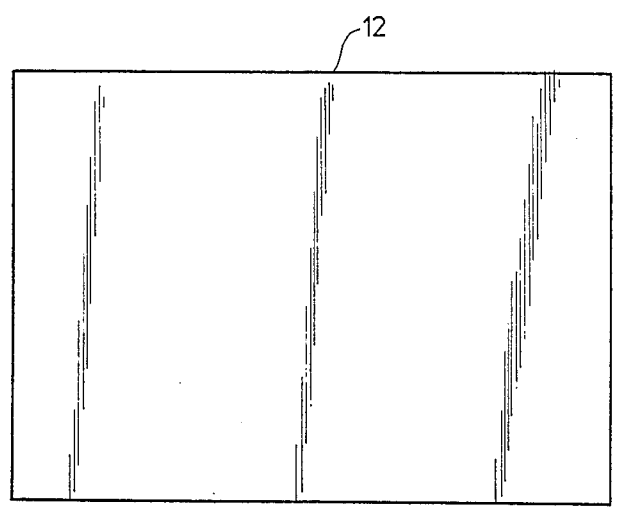
FIG. 3 is a bottom plan view of the invention.

With reference now to the drawings, and in particular to FIGS. 1, 2 and 3 thereof, a new and improved hair dryer support stand embodying the principles and concepts of the present invention and generally designated by the reference numeral 10 will be described.

More specifically, it will be noted that the hair dryer support stand 10 essentially comprises a base 12 having a pair of upstanding support arms 14, 16 to which a hair dryer support ring 18 is pivotally attached. The upstanding support arms 14, 16 are integrally or otherwise fixedly secured to a rectangularly shaped tray member 20 which has the base member 12 functioning as its floor. The tray 20 is fixedly secured to the base member 12 and is designed to hold hair clips, bobby pins, and the like. Threaded fasteners 22 may be used to fixedly secure the hair dryer retaining ring 18 to the upstanding support arms 14, 16, and the fasteners are tightened to a degree which allows pivotal movement of the support ring while sufficient friction is provided to retain the ring in a chosen angulated position.

The ring 18 is of a substantially circular design and includes a gap portion 24 through which an electric cord can be positioned during a securing of a hair dryer within the ring. A movable thumbscrew 26 is designed to fixedly secure a hair dryer within the support ring 18. In recognition of the problem that a hair dryer supported within the ring 18 might be somewhat unstable, one wall portion of the ring is provided with a longitudinal extension 28. The extension 28 is positioned along an axial length of a supported hair dryer and serves to provide additional stability to the hair dryer once the thumbscrew 26 has been utilized to fixedly secure the handle of the dryer within the ring 18. As such, a preferred embodiment of the invention would have the thumbscrew 26 positioned substantially opposite the longitudinal extension 28, although the drawings illustrate the fact that such extension can be positioned virtually anywhere around the ring 18 to still achieve the same desired stabilizing effect.

As to the manner of usage and operation of the present invention, the same should be apparent from the above description. Accordingly, no further discussion regarding the manner of usage and operation will be provided. In effect, the hair dryer support assembly 10 is designed to free the hands of a user during an operation of a hair dryer, and is desirably constructed substantially completely from clear lucite so as to improve its aesthetic appearance. The ring 18 is designed to receive and support the handle of a hair dryer in a manner which allows a hair dryer to be retained therein with or without the use of the thumbscrew 26.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An appliance holder for holding a blow dryer, comprising:

a support base;

an upstanding tray on said support base for storing miscellaneous accessory items;

a pair of spaced parallel upstanding support arms connected to opposite side wall portions of said tray;

a cylindrical support ring;

means mounting aid support ring for pivotal adjustment between said support arms;

a thumb screw threadably received through said support ring for selective frictional engagement with a blow dryer;

a gap formed in a cylindrical side wall of said support ring, said gap serving to permit an electric cord to be positioned therethrough during insertion of a blow dryer within said support ring; and a longitudinally extending support member forming a part of said support ring, said support member providing additional stability to said blow dryer when said blow dryer is retained within said support ring, said support member positioned substantially opposite from said thumbscrew, whereby said thumbscrew forces said blow dryer into engagement with said support member.

* * * * *